United States Patent
Pegrum et al.

(10) Patent No.: US 6,996,102 B2
(45) Date of Patent: Feb. 7, 2006

(54) METHOD AND APPARATUS FOR ROUTING DATA TRAFFIC ACROSS A MULTICAST-CAPABLE FABRIC

(75) Inventors: Scott Pegrum, Nepean (CA); Matthew Yuen, Ottawa (CA); Alicja Celer, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1035 days.

(21) Appl. No.: 09/740,932

(22) Filed: Dec. 21, 2000

(65) Prior Publication Data
US 2002/0080720 A1    Jun. 27, 2002

(51) Int. Cl.
*H04L 12/56*    (2006.01)

(52) U.S. Cl. ........................ 370/390; 370/384; 370/426

(58) Field of Classification Search ................. 370/390, 370/395.3, 395.2, 395.21, 384, 410, 426, 370/522
See application file for complete search history.

(56) References Cited

U.S. PATENT DOCUMENTS

2002/0196796 A1 * 12/2002 Ambe et al. ................ 370/401
2004/0174898 A1 *  9/2004 Kadambi et al. ........... 370/463

* cited by examiner

*Primary Examiner*—Wellington Chin
*Assistant Examiner*—Mark A. Mais
(74) *Attorney, Agent, or Firm*—Kent Daniels; Ogilvy Renault LLP

(57) ABSTRACT

Data traffic is conveyed through a node of a communications network. A parameter respecting the data traffic is assigned in an ingress interface of the node, and inserted into an intra-switch header attached to each packet. The data traffic, along with the intra-switch header are forwarded across the node to an egress interface. The parameter is then extracted from the intra-switch header, and used to control processing of the data traffic in the egress interface. The parameter may provide information identifying the source of the data traffic, but may also include other flow-specific information, such as, for example, a normalized DiffServ Code Point. The parameter may be used, in combination with an intra-switch multicast group ID to query one or more translation tables, to thereby enable egress-interface and/or egress port specific replication, forwarding and translation services in respect of the data traffic.

58 Claims, 3 Drawing Sheets

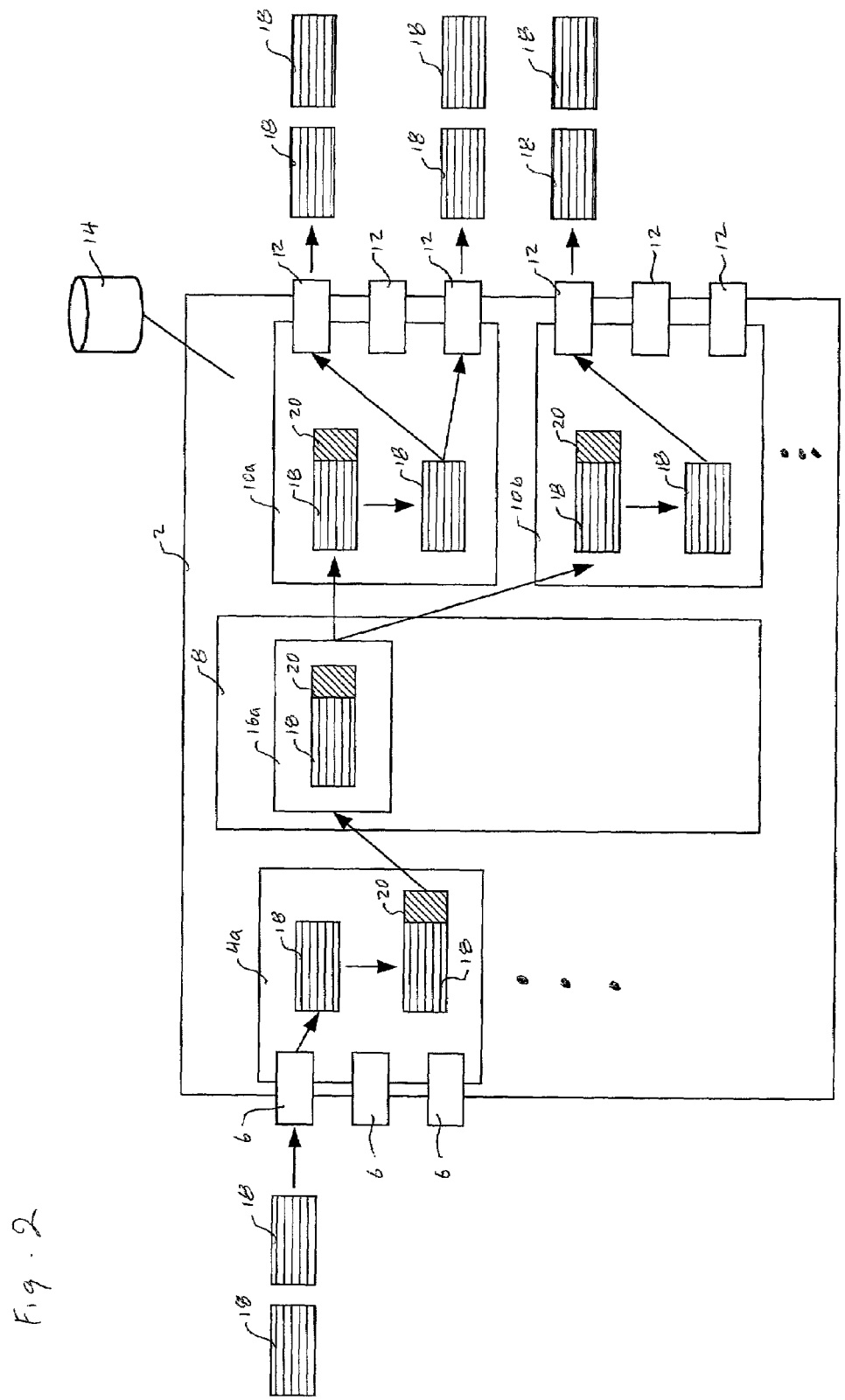

METHOD AND APPARATUS FOR ROUTING DATA TRAFFIC ACROSS A MULTICAST-CAPABLE FABRIC

CROSS-REFERENCE TO RELATED APPLICATIONS

This is the first application filed for the present invention.

MICROFICHE APPENDIX

Not Applicable.

TECHNICAL FIELD

The present invention relates to routing of packetized data traffic within a node of a communications network, and in particular to a method an apparatus for routing packetized data traffic across a multicast-capable fabric of a network node.

BACKGROUND OF THE INVENTION

In high-speed layer-2/layer-3 network nodes (e.g. Internet protocol—IP routers), the majority of packet processing normally occurs as each packet enters the node (referred to as ingress processing). Such ingress processing typically includes forwarding table look-up and routing control for conveying data traffic (e.g. packets) through a switch fabric of the node to an appropriate egress port. In the case of multicast traffic, replication of packets is frequently also performed during the ingress processing, along with any translation services that may be needed, for example, to support the transport of traffic between heterogenous Diff-Serv domains. A minimal amount of egress processing is typically performed as each packet leaves the switch.

As demand for highly scalable, multicast-capable switches increases, it becomes increasingly desirable to reduce the ingress processing requirements of the node. A known method of accomplishing this involves pushing some functionality onto the fabric and/or increasing the egress processing functionality.

For example, a multicast capable fabric is known which alleviates packet replication requirements of the ingress processing, by replicating multicast traffic to the destination egress interfaces within the fabric itself (many methods may be used here, such as a shared memory fabric). Typically, this is accomplished by defining an intra-switch multicast group (which is an entirely intra-switch construct, and should not be confused with any external multicast groups mapped across the network itself), and assigning one or more egress interfaces to the intra-switch multicast group. For example, an intra-switch multicast group may be defined between an ingress interface A and egress interfaces X, Y and Z. Packets received by the intra-switch multicast group, through ingress interface A, are replicated and forwarded to each of the egress interfaces X, Y and Z, each of which, in turn, is then responsible for replication of the data traffic to one or more respective egress ports or logical connections, as required.

This arrangement removes traffic replication from the ingress processing, and thereby produces a processing architecture that is more balanced between the ingress and egress sides of the node. However, information identifying a source of the multicast traffic (e.g. an ingress port through which the traffic is received by the node) is not available to either the switch fabric or the egress interface. As a result, an egress interface is unable to distinguish between packets of different multicast traffic flows, and thus cannot provide flow-specific routing of multicast traffic to respective egress ports or logical connections. Consequently, each egress interface must be uniquely associated with a single intra-switch multicast group, and segregation of multicast traffic flows handled during ingress processing. This arrangement severely limits the number of multicast groups that can be mapped through the switch fabric. It is therefore common for external multicast groups (ie IP or VLANs) to exhaust the capabilites of the switch fabric to support separate multicast groups.

Accordingly, a method and apparatus that enables overloading of the switch fabric to facilitate enhanced scalability of a multicast capable switch having a balanced processing architecture remains highly desirable. In this context, the term "overloading the switch fabric" shall be understood to refer to a state in which an egress interface participates in two or more intra-switch multicast groups with non-overlapping logical egress port replication requirements.

SUMMARY OF THE INVENTION

An object of the present invention is to provide method and apparatus which enables maximized scalability of a multicast capable switch by overloading the switch fabric.

Accordingly, an aspect of the present invention provides a method of conveying data traffic through a node of a communications network. A parameter respecting the data traffic is assigned in an ingress interface of the node. The data traffic and the respective parameter are forwarded across the node to an egress interface. The data traffic is then processed in the egress interface using the parameter.

A further aspect of the present invention provides a node of a communications network. The node comprises: an ingress interface adapted to assign a parameter respecting data traffic received over the network; an egress interface adapted to process the data traffic using the parameter; and means for conveying the data traffic and the respective parameter across the node between the ingress interface and the egress interface.

Another aspect of the present invention provides an ingress interface of a network node. The ingress interface is adapted to receive inbound data traffic over a communications network, and comprises: means for assigning a parameter respecting the data traffic received over the network; and means for forwarding the data traffic and the respective parameter to an egress interface of the network node.

Another aspect of the present invention provides an egress interface of a network node. The egress interface is adapted to send outbound data traffic over a communications network, and comprises: means for receiving data traffic and a respective parameter through the node from an ingress interface of the node; and means for processing the data traffic using the respective parameter.

Another aspect of the present invention provides a software program for controlling an ingress interface of a network node. The ingress interface is adapted to receive inbound data traffic over a communications network. The software program comprises: means for assigning a parameter respecting the inbound data traffic; and means for forwarding the data traffic and the respective parameter to an egress interface of the network node.

Another aspect of the present invention provides a software program for controlling an egress interface of a network node. The egress interface is adapted to send outbound data traffic over a communications network. The software program comprises means for processing the data traffic using a respective parameter received from an ingress interface of the node.

The parameter may comprise any one or more of: information identifying the ingress interface; information identifying a quality of service (QoS) of data traffic received by the ingress port; information identifying a DiffServ codepoint of data traffic received by the ingress port; and information identifying a source logical port of data traffic received by the ingress port.

In embodiments of the invention, the data traffic is evaluated in the ingress interface to derive a value of the parameter. A default value of the parameter may be assigned as part of the evaluation. The default valve may be based on a logical port record. One or more headers of the data traffic may also be evaluated, and the default value of the parameter modified based on the evaluation result. In some embodiments, the data traffic includes a multi-layered header. In such cases, the header of each successive layer may be evaluated, and the default valve modified based on the evaluation result.

The parameter may be a normalized parameter value (e.g. a normalized DiffServ codepoint value) obtained by successively evaluating each one of a plurality of layer headers of the data traffic, and modifying the parameter value based on each successive evaluation result.

In embodiments of the invention, the data traffic and the respective parameter are conveyed across the network node by: inserting the parameter into a header; and appending the header to the data traffic. The header is preferably stripped from the data traffic in the egress interface.

The data traffic and the respective parameter may be conveyed to the egress interface through a multicast-capable switch fabric. In such cases, the data traffic and the respective parameter are forwarded by the switch fabric to one or more egress interfaces of the network node.

In embodiments of the invention, processing the data traffic in the egress interface comprises any one or more of: implementing a traffic policing function; forwarding the data traffic to one or more respective logical egress ports associated with the egress interface; and applying a predetermined policy. Implementation of the traffic policing function may include discarding low-priority traffic in order to reduce congestion of the egress interface. The policy may be defined in respect of (i.e. specific to) the egress interface, or alternatively in respect of a respective logical egress port. The policy may include any one or more of: PASS; DROP; and TRANSLATE. The PASS policy may cause transmission of the data traffic from the node using a selected logical egress port associated with the egress interface. Conversely, the DROP policy may prevent transmission of the data traffic from the node using a selected logical egress port associated with the egress interface. The TRANSLATE policy may be adapted to modify one or more of a VLAN ID of the data traffic; a QoS parameter of the data traffic; and a DiffServ codepoint of the data traffic.

In some embodiments, application of the TRANSLATE policy includes: querying a translation table; and inserting the query result into the data traffic. In such cases, The translation table preferably comprises, for each parameter value, information identifying any one or more of: the VLAN ID; the QoS parameter; and the DiffServ codepoint. The translation table may be specific to the egress interface, or alternatively the translation table may be specific to a logical egress port of the egress interface.

An advantage of the present invention is that the computational burden associated with routing multicast traffic through a network node is distributed between the ingress and egress sides of the switch fabric, which yields improved reliability and efficiency of operation. A further advantage of the present invention is that it enables translation services (e.g. conversion of DSCPs at a boundary between heterogenous DiffServ domains, modification of VLAN IDs etc.) to be readily provided in a multicast environment.

The present invention enables appropriate replication of multicast packets where policies need to be applied; overloading of the switch fabric multicast capabilities to support larger numbers of multicast groups than would otherwise be possible with conventional multicast-capable switch fabrics; and the arbitrary connection of IEEE802.q VLANS, within a single network node.

BRIEF DESCRIPTION OF THE DRAWINGS

Further features and advantages of the present invention will become apparent from the following detailed description, taken in combination with the appended drawings, in which:

FIG. 2 is a block diagram schematically illustrating operation of the network node of FIG. 1;

It will be noted that throughout the appended drawings, like features are identified by like reference numerals.

DETAILED DESCRIPTION OF THE PREFERRED EMBODIMENT

The present invention facilitates enhanced scalability of a multicast-capable switch by overloading of external multicast groups onto intra-switch multicast groups with non-overlapping logical egress port replication requirements, as well as supporting policy-based handling of multicast traffic.

Figure 1:
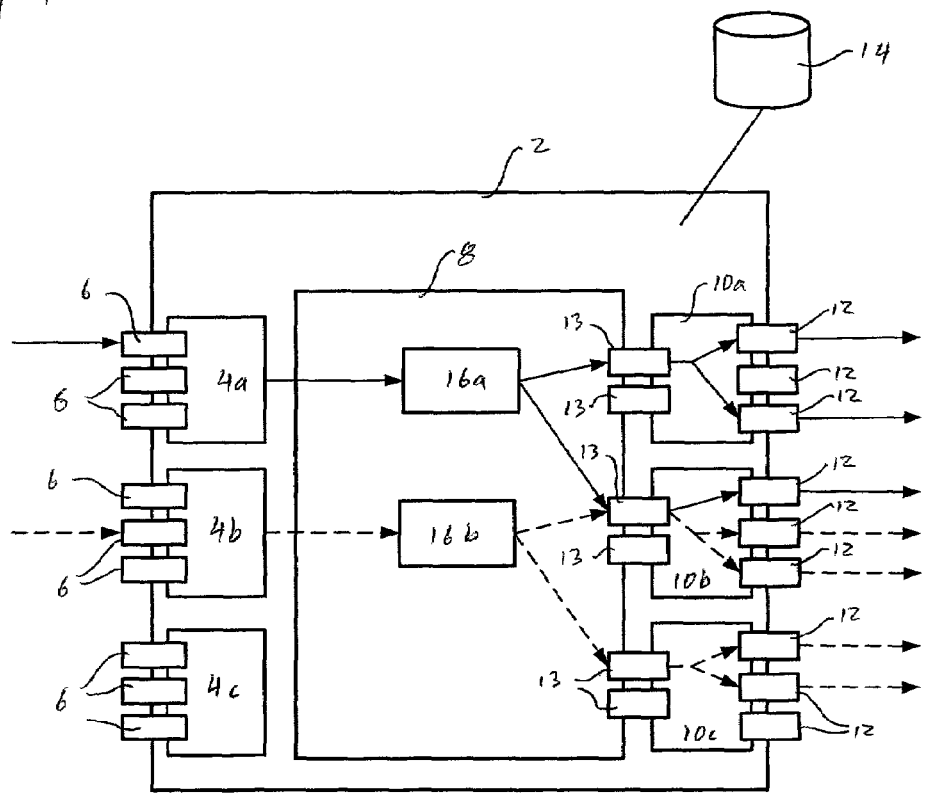
FIG. 1 is a block diagram schematically illustrating a network node in accordance with an embodiment of the present invention.

FIG. 1 is a block diagram schematically illustrating operation of a network node 2 in accordance with the present invention. The node 2 may be deployed as a router or switch within a broadband packet network (not shown), such as, for example, an Internet Protocol (IP) or an Asynchronous Transfer Mode (ATM) network, and adapted for switching and/or routing multicast (i.e. point-to-multiple points)or unicast (i.e. point-to-point) data traffic. As shown in FIG. 1, the node 2 generally comprises a plurality of ingress interfaces 4a–4c, each having a respective plurality of ingress network ports 6; a multicast-capable switch fabric 8; and a plurality of egress interfaces 10a–10c, each having a respective plurality of egress network ports 12, and switch ports 13. A database 14 contains one or more forwarding tables, and/or translation tables enabling flow-specific processing of data traffic within the node 2. The database 14 may be co-resident with the node 2, or remote from the node 2 and accessible by the node 2 through the network.

Each ingress interface 4a–c may conveniently be provisioned as a physical network interface card (NIC) adapted, by means of suitable hardware and/or software, to enable ingress processing of received data traffic in the manner described below. Each ingress network port 6 is adapted (again, by means of suitable hardware and software) to receive inbound data traffic through one or more up-stream data channels of a network. This functionality may be implemented using a conventional physical network port (which may include any of conventional signal demultiplexing, detection and conditioning circuits), and/or a logical port connection mapped from another point within the network using, for example, a sub-connection identifier such as an IEEE802.3q VLAN Tag.

The multicast-capable switch fabric 8 may be provided as a conventional multicast-capable switch fabric having a standard backplane interconnection switch topology. As such, the fabric 8 operates to process data traffic between the ingress and egress interfaces 4,10 without visibility of the content of the involved data packets.

Each egress interface 10a–c may conveniently be provisioned as a physical interface card adapted, by means of suitable hardware and/or software, to enable egress processing of outbound data traffic in the manner described below. Each egress network port 12 is adapted (again, by means of suitable hardware and/or software) to launch outgoing data traffic through one or more down-stream data channels of the network. As with the ingress network ports 6, this functionality may be implemented using a conventional physical network port (which may include any of conventional signal conversion and multiplexing circuits), and/or a logical port connection mapped to another point within the network using, for example, a sub-connection identifier such as an Ethernet 802.3 VLAN Tag.

Each switch port 13 is adapted, by means of suitable hardware and/or software, to couple a respective egress interface 10 to the switch fabric 8.

In the embodiment illustrated in FIG. 1, three ingress and egress interfaces 4,10 are provided, each interface having three respective network ports 6,12. However, it will be understood that there may be fewer or more than three ingress and egress interfaces, and that the number of ingress interfaces 4 may differ from the number of egress interfaces 10. Similarly, it will be appreciated that the number of ingress network ports 6 provisioned within each ingress interface 4 may differ from the number of egress network ports 12 provisioned within each egress interface 10, and may differ from that shown in FIG. 1. Similarly, each egress interface 10 may include more or fewer switch ports 13 than illustrated in FIG. 1.

In the illustrated embodiment, unidirectional traffic flows are illustrated. Thus inbound data traffic is received through an upstream data channel by an ingress network port 6 of a respective ingress interface 4, passed through the switch fabric 8, and is launched into a downstream data channel through an egress network port 12 of a respective egress interface 10. It will be appreciated that traffic flows will, in general, be bidirectional. However, for simplicity of illustration and description of the present invention, unidirectional traffic flows will be provided.

In order to facilitate transport of multicast data traffic through the node 2, an intra-switch multicast group 16 is mapped through the fabric 8 between a respective ingress interface 4 and one or more egress interfaces 10. In the embodiment illustrated in FIG. 1, a pair of intra-switch multicast groups 16a and 16b are mapped through the switch fabric 8, each carrying data traffic of respective external multicast groups (not shown). As shown in FIG. 1, each intra-switch multicast group 16a,b replicates data traffic of the respective external multicast group to a respective set of egress interfaces 10, which then forward the data traffic (with any necessary replication) to one or more respective egress network ports 12.

In accordance with the present invention, the intra-switch multicast groups 16 may be overloaded within the switch fabric 8. Thus, as shown in FIG. 1, the intra-switch multicast groups 16a,b have overlapping sets of egress interfaces 10, while retaining non-overlapping sets of egress network ports 12. In particular, both of the intra-switch multicast groups 16a,b duplicate traffic to egress interface 10b, which implements flow-specific egress processing to ensure that data traffic of each intra-switch multicast group is properly routed to appropriates ones of its respective logical egress ports 12. In general, the intra-switch multicast groups 16 may overlap in any combination of egress switch port 13, egress interface 10, and egress policy. In accordance with the present invention, flow-specific egress processing is enabled by assigning a respective parameter to each traffic stream in the respective ingress interface 4. This parameter is then conveyed across the fabric 8 to the egress interfaces 10 where it may be used to control the egress processing of the traffic stream. An exemplary method by which this may be accomplished is illustrated in FIG. 2.

As shown in FIG. 2, as successive packets 18 of an incoming multicast traffic stream are processed by the ingress interface 4a, an intra-switch header 20 is attached to each packet 18. The contents of the intra-switch header 20 may vary (as will be described in greater detail below) depending on various factors, such as the nature of the traffic flow and the presence of heterogenous DiffServ domains on the ingress and egress sides of the node 2. However, at a minimum, the intra-switch header 20 contains a parameter respecting the incoming traffic stream.

For example, the parameter may include information indicative of the ingress network port 6 through which the traffic stream was received. Information useful for identifying the ingress network port 6 includes an ingress port identifier; an ingress interface (i.e. source card) identifier; and an ingress (source) physical port identifier, any (or all) of which may be carried within a single multi-bit sequence inserted in the header 20 as the parameter. In a VLAN environment, a VLAN identifier may be mapped to the ingress interface identifier. In general, the length of the multi-bit sequence can be selected as desired, depending on the number of identifiers to be included, and the size of each identifier. The size of the ingress interface and ingress physical port identifiers will normally be based upon the size of the node 2, and thus may vary, as may the size of the logical ingress port identifier.

Each packet 18, along with its attached intra-switch header 20, is forwarded through the switch fabric 8 using a respective intra-switch multicast group 16a to facilitate replication of the packet 18 (and header 20) to each egress switch port 13 involved in the intra-switch multicast group 16. Because the switch fabric 8 processes data streams without visibility of the content of data packets, the switch fabric 8 is unaware of the content of the intra-switch header 20. Accordingly, the switch fabric 8 processes packets 18 and headers 20 (with appropriate replication and forwarding within an intra-switch multicast group) in a conventional manner, with the intra-switch header 20 merely treated as additional data payload of its associated packet 18.

When a packet 18 is received by an egress network interface 10, its intra-switch header 20 is stripped from the packet 18, and the parameter extracted for use (possibly in combination with an intra-switch multicast group identifier) to control egress processing of the packet 18. In a simple embodiment, this functionality may involve implementing a traffic policing function, for example to reduce detected congestion within the egress interface (i.e. the traffic forwarding and/or policy-based processing functionality of the egress interface. For example, if congestion within the egress interface is detected, low priority traffic (which may be identified by the parameter and or a QoS tag such as a DSCP value) may be discarded, to thereby to reduce the congestion.

Further egress processing may involve using the parameter to query a forwarding table (not shown), and thereby enable routing of the packet 18 to appropriate logical egress ports 12 of the egress interface 6. Thus a single egress interface 6 can successfully process traffic flows of multiple intra-switch multicast groups 16, provided that the involved intra-switch multicast groups 16 do not have overlapping (that is conflicting) egress port 12 assignments within any one egress interface 10. The intra-switch multicast groups 16 may or may not overlap in any combination of egress switch port 13, egress interface 10, or egress policy. Over-loading of intra-switch multicast groups 16 within the switch fabric 8 is thereby enabled, allowing data traffic of a greater number of external multicast groups to be mapped through the node 2 without exhausting the capacity of the node 2. In alternative embodiments, more sophisticated, policy-based egress processing can be implemented. Three exemplary embodiments of such policy based egress processing are described, by way of example, below.

EXAMPLE 1

FIGS. 1 and 2 illustrate an embodiment of the present invention in which a multicast traffic stream is conveyed through the node 2 between ingress interface 4a and egress interfaces 10a and 10b via an intra-switch multicast group 16a mapped through the switch fabric 8. In the example of FIGS. 1 and 2, the parameter provides information identifying the ingress network port 6 of the respective data stream, and includes ingress interface (i.e. card) 4a, ingress network port 6, and source physical port identifiers. In combination with the intra-switch multicast group ID (which is conventionally passed to each egress interface 10a,10b during setup of the intra-switch multicast group 16a), this parameter can be used to control egress processing of the data stream. This egress processing may be specific to the egress interface (that is, all traffic flowing through the same egress interface 10a,10b receives the same egress processing), or alternatively may be specific to the egress network port 12, so that data streams flowing through each egress network port 12 may be subject to respective different egress processing.

In addition to replication and forwarding of the data traffic to respective egress network ports 12, the parameter (and switch multicast group ID) may advantageously be used to select a set of predetermined egress processing records. In an IP multicast environment, these egress processing records may, for example, represent PASS, DROP and TRANSLATE policy decisions based on the external multicast address of the packet. In order to access the appropriate egress processing records, the egress processing functionality of each egress interface 10a,10b extracts the parameter from the header 20, and then decodes the extracted parameter to obtain the logical ingress port, ingress interface and ingress physical port identifiers. These identifiers can then be used, in combination with the intra-switch multicast group ID, to query a translation table. Exemplary egress processing behaviours resulting from assertion of each of the PASS, DROP and TRANSLATE policy decisions are as follows:

Assertion of a PASS policy decision in an interface-specific egress processing environment may be used to cause the respective data traffic to be transmitted across the network through one or more respective egress network ports 12 of the associated egress interface 10. Similarly, assertion of a PASS policy decision in a port-specific egress processing environment may be used to cause the respective data traffic to be transmitted across the network through the associated egress network port.

Assertion of the DROP policy decision in an interface-specific egress processing environment may be used to prevent data transmission through any egress network ports 12 of the associated egress interface 10. Similarly, assertion of the DROP policy decision in a port-specific egress processing environment may be used to cause the respective data traffic to be dropped, thereby preventing data transmission through the associated egress network ports 12.

Assertion of the TRANSLATE policy decision in either a port-specific or interface-specific egress processing environment may be used to cause one or more attributes of the data traffic to be modified prior to transmission through the associated egress network port(s). Examples 2 and 3 below provide examples of the use of this functionality.

EXAMPLE 2

Figure 3:
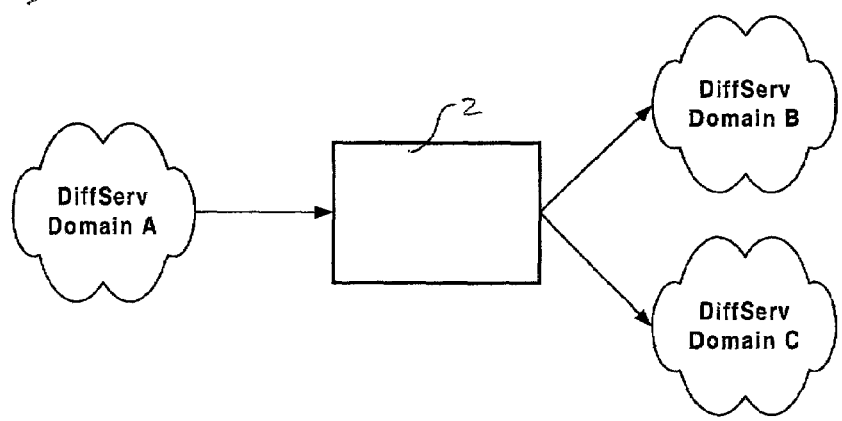
FIG. 3 is a block diagram illustrating replication of multicast traffic to heterogenous DiffServ domains.

FIG. 3 is a block diagram illustrating replication and forwarding of multicast traffic to heterogenous DiffServ domains. In this respect, DiffServe domains are considered to be "heterogenous" if QoS information encoded within the packet overhead must be modified (or "adapted") in order to obtain equivalent QoS handling within each domain. In this situation, at least the DiffServ Codepoint (DSCP), (and possibly other QoS parameters of the data traffic) must be modified in order to obtain uniform QoS treatment in each of the respective DiffServ domains. This can be accomplished by assertion of a TRANSLATE policy decision to implement adaptation of the DSCP (and possibly other QoS parameters) to facilitate transport of data traffic between the heterogenous DiffServ domains.

In simple embodiments, the parameter contained in the intra-switch header 20 may be used to query a translation table (which may be egress port specific) of the database 14 to obtain a new DSCP for the outgoing data traffic. However, enhanced performance can be obtained by evaluating the data traffic during ingress processing to determine a normalized DSCP for the data traffic. This normalized DSCP may be conveyed to the egress interface within the intra-switch header 20 (e.g. as part of the parameter), or by replacing the DSCP within the packet overhead with the normalized DSCP value. Principal steps in an exemplary method of determining the normalized DSCP are as follows:

1. assign a default normalized DSCP value;
2. evaluate the layer-2 packet overhead, and modify the default normalized DSCP value in accordance with the evaluation result;
3. evaluate the layer-3 (IP) packet overhead, and modify the previous normalized DSCP value in accordance with the evaluation result; and
4. evaluate the layer-4 (TCP/UDP) packet overhead, and modify the previous normalized DSCP value in accordance with the evaluation result.

Logically, evaluation of packet headers, and subsequent modification of the default (or normalized) DSCP valve may be conducted for as few, or as many layers as desired. Thus the above evaluation steps could continue to layer OSI layer 7 (application layer) if desired.

A further policing function may also be applied, for example to lower the resulting normalized DSCP in the event that insufficient bandwidth resources are available.

During egress processing, the normalized DSCP value can be used to query a translation table of the database 14 to obtain a DSCP value appropriate to the DifServ domain into which the outgoing traffic will be sent. This DSCP value can then be inserted into the overhead of outgoing packets.

EXAMPLE 3

Figure 4:
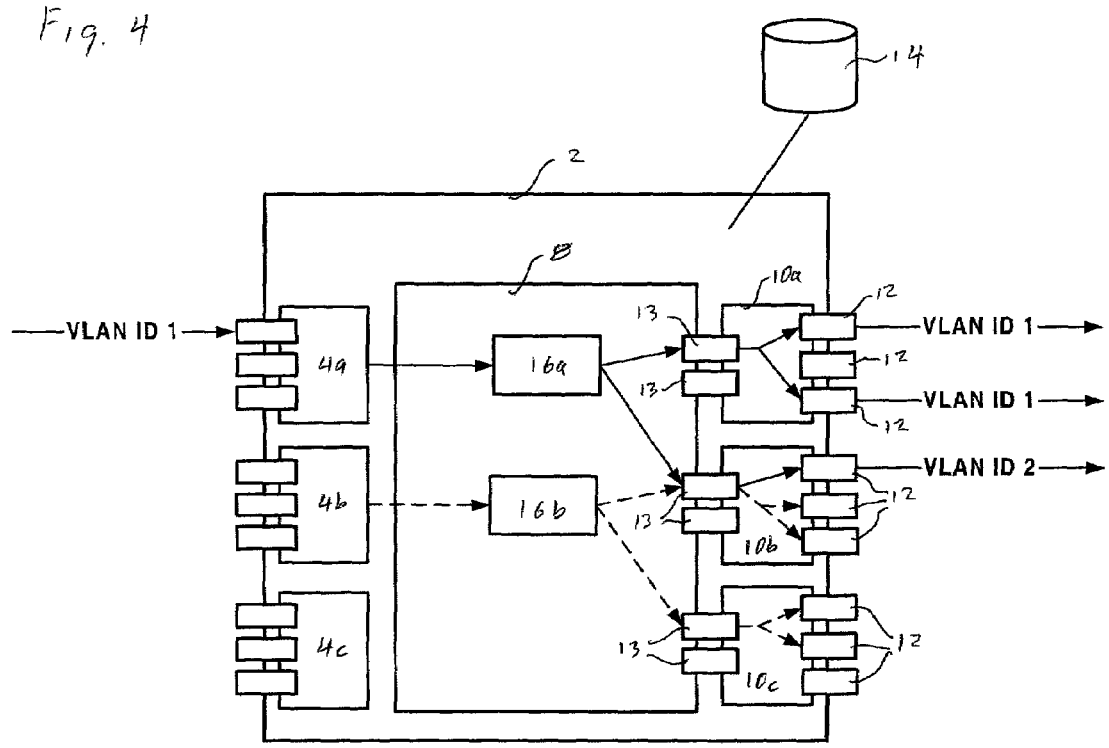
FIG. 4 is a block diagram illustrating replication of multicast traffic within a VLAN environment.

FIG. 4 is a block diagram illustrating replication of multicast traffic within a VLAN environment. In this case, it is known that branches of a common VLAN can be set up having differing VLAN IDs. While this is not an intended result of the VLAN setup procedure, it can occur, and thus a VLAN network node must be able to accommodate this situation. In accordance with the present invention, the TRANSLATE policy decision can be used, during egress processing, to modify the VLAN ID within the overhead of outgoing packets. Thus in a VLAN environment, the TRANSLATE policy option allows for the arbitrary translation (on an egress port-specific basis) between the input VLAN identifier to any egress VLAN identifier, thereby providing a 1 to N translation capability. This functionality may be implemented using a normalization procedure similar to that described above in respect of the DSCP translation. In some cases, however, it may not be necessary to use an approach as computationally intensive as the evaluation of a normalized valve. Instead, a simple translation table lookup, based on the parameter contained in the intra-switch header 20 and the VLAN ID contained within packet overhead, may be used to obtain a new VLAN ID for outgoing data traffic.

Thus it will be seen that the present invention provides a method an apparatus by means of which the switch fabric multicast capabilities are overloaded to support larger numbers of multicast groups, and appropriate replication and forwarding of multicast packets are obtained through the application of policies during egress processing. Egress-interface and/or egress-port specific application of policies enables flow-specific translation services to be implemented, thereby enabling adaptation of DSCPs between differing DiffServ domains, and the arbitrary connection of IEEE802.q VLANS, within a single network node. Additionally, the computational load associated with routing multicast traffic through a network node is distributed between the ingress and egress sides of the switch fabric, yielding improved reliability and efficiency of operation.

The embodiment(s) of the invention described above is(are) intended to be exemplary only. The scope of the invention is therefore intended to be limited solely by the scope of the appended claims.

We claim:

1. A method of conveying data traffic though a node of a communications network, the method comprising the steps of:
 a) assigning a parameter respecting the data traffic in an ingress interface;
 b) conveying the data traffic and the respective parameter to selected ones of a plurality of egress interfaces, each egress interface having a respective plurality of logical egress network ports; and
 c) in the egress interface, forwarding the data traffic to one or more of the respective plurality of logical egress network ports based on the parameter.

2. A method as claimed in claim 1, wherein the parameter comprises any one or more of: information identifying the ingress interface; information identifying a quality of service (QoS) of data traffic received by the ingress port; information identifying a DiffServ codepoint of data traffic received by the ingress port; and information identifying a source address of data traffic received by the ingress port.

3. A method as claimed in claim 2, wherein the step of assigning a parameter comprises a step of evaluating the data traffic to derive a value of the parameter.

4. A method as claimed in claim 3, wherein the step of evaluating the data traffic comprises a step of assigning a default value of the parameter.

5. A method as claimed in claim 4, further comprising the steps of:
 a) evaluating one or more layer-specific headers of the data traffic; and
 b) modifying the default value of the parameter based on the evaluation result.

6. A method as claimed in claim 5, wherein the parameter is a normalized parameter value obtained by successively evaluating each one of the one or more layer-specific headers in turn, and modifying the parameter value based on each successive evaluation result.

7. A method as claimed in claim 1, wherein the step of conveying the data traffic and the respective parameter comprises the steps of:
 a) inserting the parameter into an intra-switch header; and
 b) appending the intra-switch header to the data traffic.

8. A method as claimed in claim 7, wherein the step of forwarding the data traffic comprises stripping the intra-switch header from the data traffic.

9. A method as claimed in claim 7, wherein the step of conveying the data traffic and the respective parameter further comprises a step of conveying the data traffic through a multicast-capable switch fabric.

10. A method as claimed in claim 9, wherein the data traffic and the respective parameter are replicated by the switch fabric to each selected egress interfaces of the node.

11. A method as claimed in claim 1, wherein the step of forwarding the data traffic in the egress interface further comprises either one or both of: implementing a traffic policing function; and applying a predetermined policy.

12. A method as claimed in claim 11, wherein the step of implementing the traffic policing function comprises:
 a) detecting congestion of the egress interface, and
 b) discarding low-priority traffic such that the congestion is reduced.

13. A method as claimed in claim 11, wherein the policy is defined in respect of the egress interface.

14. A method as claimed in claim 11, wherein the policy is defined in respect of an egress network port associated with the egress interface.

15. A method as claimed in claim 11, wherein the policy comprises any one or more of: PASS; DROP; and TRANSLATE.

16. A method as claimed in claim 15, wherein the PASS policy is adapted to cause transmission of the data traffic from the node using a selected logical egress port associated with the egress interface.

17. A method as claimed in claim 15, wherein the DROP policy is adapted to prevent transmission of the data traffic from the node using a selected logical egress port associated with the egress interface.

18. A method as claimed in claim 15, wherein the TRANSLATE policy is adapted to modify one or more of a VLAN ID of the data traffic; a QoS parameter of the data traffic; and a DiffServ codepoint of the data traffic.

19. A method as claimed in claim 18, wherein the step of applying the TRANSLATE policy comprises the steps of:
 a) querying a translation table; and b) inserting the query result into the data traffic.

20. A method as claimed in claim 19, wherein the translation table comprises, for each parameter value, information identifying any one or more of: the VLAN ID; the QoS parameter, and the DiffServ codepoint.

21. A method as claimed in claim 19, wherein the translation table is specific to the egress interface.

22. A method as claimed in claim 19, wherein the translation table is specific to a logical egress network port of the egress interface.

23. A node of a communications network, comprising:
  a) an ingress interface adapted to assign a parameter respecting data traffic received over the network;
  b) a plurality of egress interfaces having a respective plurality of logical egress network ports, each egress interface being adapted to forward the data traffic to one or more of its respective plurality of logical egress network ports using the parameter; and
  c) means for conveying the data traffic and the respective parameter across the node between the ingress interface and selected ones of the plurality of egress interfaces.

24. A node as claimed in claim 23, wherein the parameter comprises any one or more of: information identifying the ingress interface; information identifying a quality of service (QoS) of data traffic received by the ingress interface; information identifying a DiffServ codepoint (DSCP) of data traffic received by the ingress interface; and information identifying a source address of data traffic received by the ingress interface.

25. A node as claimed in claim 24, wherein the ingress interface comprises means for evaluating the data traffic to determine a value of the parameter.

26. A node as claimed in claim 25, wherein the means for evaluating the data traffic is adapted to assign a default value of the parameter.

27. A node as claimed in claim 26, wherein the means for evaluating the data traffic further comprises:
  a) means for evaluating one or more layer-specific headers of the data traffic; and
  b) means for modifying the default value of the parameter based on the evaluation result.

28. A node as claimed in claim 27, wherein the parameter is a normalized parameter value obtained by successively evaluating each one of the one or more layer-specific headers, and modifying the parameter value based on each successive evaluation result.

29. A node as claimed in claim 23, wherein the means for conveying the data traffic and the respective parameter comprises:
  a) means for inserting the parameter into a header; and
  b) means for appending the header to the data traffic.

30. A node as claimed in claim 29, wherein the header is stripped from the data traffic in the egress interface.

31. A node as claimed in claim 29, wherein the means for conveying the data traffic and the respective parameter further comprises a multicast-capable switch fabric.

32. A node as claimed in claim 31, wherein the multicast-capable switch network is adapted to replicate the data traffic and the respective parameter to one or more egress interfaces of the node.

33. A node as claimed in claim 23, wherein the egress interface comprises means for implementing a traffic policing function.

34. A node as claimed in claim 33, wherein the means for implementing the traffic policing function comprises:
  a) means for detecting congestion of the egress interface; and
  b) means for discarding low-priority traffic such that the congestion is reduced.

35. A node as claimed in claim 23, wherein the egress interface comprises means for applying a predetermined policy respecting the data traffic.

36. A node as claimed in claim 35, wherein the policy is specific to the egress interface.

37. A node as claimed in claim 35, wherein the policy is specific to a logical egress port associated with the egress interface.

38. A node as claimed in claim 35 wherein the policy comprises any one or more of: PASS; DROP; and TRANSLATE.

39. A node as claimed in claim 38, wherein the PASS policy is adapted to cause transmission of the data traffic from the node using a selected logical egress port associated with the egress interface.

40. A node as claimed in claim 38, wherein the DROP policy is adapted to prevent transmission of the data traffic from the node using a selected logical egress port associated with the egress interface.

41. A node as claimed in claim 38, wherein the TRANSLATE policy is adapted to modify one or more of a VLAN ID of the data traffic; a QoS parameter of the data traffic; and a DiffServ codepoint of the data traffic.

42. A node as claimed in claim 41, wherein the means for applying the TRANSLATE policy comprises:
  a) means for querying a translation table; and
  b) means for inserting the query result into the data traffic.

43. A node as claimed in claim 42, wherein the translation table comprises, for each parameter value, information identifying any one or more of: the VLAN ID; the QoS parameter; and the DiffServ codepoint.

44. A node as claimed in claim 42, wherein the translation table is specific to the egress interface.

45. A node as claimed in claim 42, wherein the translation table is specific to a logical egress network port of the egress interface.

46. An egress interface of a network node, the egress interface being adapted to send outbound data traffic over a communications network, and comprising:
  a) means for receiving data traffic and a respective parameter from a multi-cast capable switch fabric of the node, the multi-cast capable switch fabric being adapted to replicate the data traffic and its respective parameter to a selected one or more of a plurality of egress interfaces of the network node;
  b) a plurality of logical egress network ports coupled to the communications network; and
  c) means for forwarding the data traffic to a selected one or more of the plurality of logical egress network ports using the respective parameter.

47. An egress interface as claimed in claim 46, wherein the means for forwarding the data traffic further comprises either one or both of:
  a) means for implementing a traffic policing function; and
  b) means for applying a predetermined policy respecting the data traffic.

48. An egress interface as claimed in claim 47, wherein the means for implementing the traffic policing function comprises:
  a) means for detecting congestion of the egress interface; and
  b) means for discarding low-priority traffic such that the congestion is reduced.

49. An egress interface as claimed in claim 47, wherein the policy is specific to the egress interface.

50. An egress interface as claimed in claim 47, wherein the policy is specific to a logical egress port associated with the egress interface.

51. An egress interface as claimed in claim 47, wherein the policy comprises any one or more of: PASS; DROP; and TRANSLATE.

52. An egress interface as claimed in claim 51, wherein the PASS policy is adapted to cause transmission of the data traffic from the node using a selected logical egress port associated with the egress interface.

53. An egress interface as claimed in claim 51, wherein the DROP policy is adapted to prevent transmission of the data traffic from the node using a selected logical egress port associated with the egress interface.

54. An egress interface as claimed in claim 51, wherein the TRANSLATE policy is adapted to modify one or more of a VLAN ID of the data traffic; a QoS parameter of the data traffic; and a DiffServ codepoint of the data traffic.

55. An egress interface as claimed in claim 54, wherein the means for applying the TRANSLATE policy comprises:

a) means for querying a translation table; and b) means for inserting the query result into the data traffic.

56. An egress interface as claimed in claim 55, wherein the translation table comprises, for each parameter value, information identifying any one or more of: the VLAN ID; the QoS parameter; and the DiffServ codepoint.

57. An egress interface as claimed in claim 55, wherein the translation table is specific to the egress interface.

58. An egress interface as claimed in claim 55, wherein the translation table is specific to a logical egress network port of the egress interface.

* * * * *